(12) United States Patent
Rico Alvarino et al.

(10) Patent No.: US 11,303,383 B2
(45) Date of Patent: Apr. 12, 2022

(54) SELECTION OF MODULATION AND CODING SCHEME

(71) Applicant: QUALCOMM Incorporated, San Diego, CA (US)

(72) Inventors: Alberto Rico Alvarino, San Diego, CA (US); Kirankumar Bhoja Anchan, San Diego, CA (US); Seyed Ali Akbar Fakoorian, San Diego, CA (US); Feilu Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/383,520

(22) Filed: Apr. 12, 2019

(65) Prior Publication Data

US 2019/0238258 A1 Aug. 1, 2019

Related U.S. Application Data

(62) Division of application No. 15/799,813, filed on Oct. 31, 2017, now Pat. No. 10,277,357.

(Continued)

(51) Int. Cl.
*H04L 1/00* (2006.01)
*H04L 27/00* (2006.01)
(Continued)

(52) U.S. Cl.
CPC .............. *H04L 1/0004* (2013.01); *H04L 1/00* (2013.01); *H04L 1/0023* (2013.01); *H04L 1/0025* (2013.01); *H04L 1/08* (2013.01); *H04L 27/00* (2013.01); *H04L 27/0012* (2013.01); *H04W 72/042* (2013.01)

(58) Field of Classification Search
CPC ... H04L 1/0004; H04L 1/0023; H04L 1/0025; H04L 1/08; H04L 27/0012; H04L 1/0003; H04L 1/0001; H04L 27/0008; H04L 27/362; H04L 1/0016; H04L 1/0002; H04L 1/0028; H04L 1/1671; H04W 72/042;
(Continued)

(56) References Cited

U.S. PATENT DOCUMENTS 8,705,460 B1 4/2014 Choi et al.
8,848,629 B2 9/2014 Han et al.
(Continued)

FOREIGN PATENT DOCUMENTS

| CN | 101989901 A | 3/2011 |
| TW | 201434288 A | 9/2014 |
| WO | WO-2013151715 A1 | 10/2013 |

OTHER PUBLICATIONS

3GPP TS 36.101, Version 13.3.0, Table 6.2.3, May 2016, p. 79.
(Continued)

*Primary Examiner* — Pablo N Tran
(74) *Attorney, Agent, or Firm* — Muncy, Geissler, Olds & Lowe, P.C.

(57) ABSTRACT

Techniques for indicating and/or selecting a modulation and coding scheme (MCS) are disclosed. A method for selecting the MCS may comprise receiving control information, identifying a change indicator, determining a first MCS based on the control information, and modifying the first MCS based on the change indicator to determine a second MCS.

17 Claims, 7 Drawing Sheets

Related U.S. Application Data (60) Provisional application No. 62/448,188, filed on Jan. 19, 2017.

(51) Int. Cl.
*H03K 7/06* (2006.01)
*H04L 27/36* (2006.01)
*H04L 1/08* (2006.01)
*H04W 72/04* (2009.01)

(58) Field of Classification Search
CPC ............ H04W 72/0473; H04W 52/54; H04W 52/241; H04W 52/48; H04W 72/04
See application file for complete search history.

(56) References Cited

U.S. PATENT DOCUMENTS

| | | | | |
|---|---|---|---|---|
| 8,855,132 | B2* | 10/2014 | Lohr | H04W 52/30 |
| | | | | 370/431 |
| 9,100,947 | B2 | 8/2015 | Baik et al. | |
| 9,451,625 | B2 | 9/2016 | Jöngren et al. | |
| 9,674,766 | B2* | 6/2017 | Braithwaite | H04B 7/155 |
| 9,838,175 | B2 | 12/2017 | Kim et al. | |
| 9,872,302 | B2 | 1/2018 | Jöngren et al. | |
| 10,014,891 | B2* | 7/2018 | Sagong | H04L 27/34 |
| 10,021,681 | B2* | 7/2018 | Larsson | H04L 1/0007 |
| 10,285,167 | B2* | 5/2019 | Chen | H04B 7/0413 |
| 10,326,549 | B2* | 6/2019 | Blankenship | H04L 27/2607 |
| 2005/0169391 | A1* | 8/2005 | Takeda | H04L 1/0021 |
| | | | | 375/259 |
| 2006/0115014 | A1* | 6/2006 | Jeong | H04B 7/061 |
| | | | | 375/267 |
| 2009/0257389 | A1* | 10/2009 | Mohanty | H04W 72/0406 |
| | | | | 370/329 |
| 2012/0027065 | A1* | 2/2012 | Ray | H04L 27/2647 |
| | | | | 375/224 |
| 2012/0163444 | A1* | 6/2012 | Oh | H04L 27/12 |
| | | | | 375/239 |
| 2013/0176864 | A1 | 7/2013 | Quan et al. | |
| 2013/0343255 | A1* | 12/2013 | Han | H04L 1/0009 |
| | | | | 370/312 |
| 2014/0023020 | A1* | 1/2014 | Yang | H04L 1/1671 |
| | | | | 370/329 |
| 2014/0177687 | A1 | 6/2014 | Seol et al. | |
| 2014/0362804 | A1* | 12/2014 | Han | H04L 5/0053 |
| | | | | 370/329 |
| 2015/0098411 | A1 | 4/2015 | Jöngren et al. | |
| 2015/0215068 | A1 | 7/2015 | Wu | |
| 2015/0271794 | A1 | 9/2015 | Kang et al. | |
| 2016/0352454 | A1 | 12/2016 | Zhang et al. | |
| 2018/0205488 | A1 | 7/2018 | Rico et al. | |
| 2018/0279337 | A1* | 9/2018 | Kwon | H04W 72/1257 |
| 2018/0323902 | A1* | 11/2018 | Rico Alvarino | H04L 1/0004 |
| 2018/0375630 | A1* | 12/2018 | Kim | H04L 5/0053 |
| 2019/0074929 | A1* | 3/2019 | Aiba | H04L 1/0061 |

OTHER PUBLICATIONS

ETSI TS 136 213 V8.8.0, LTE, Evolved Universal Terrestrial Radio Access (E-UTRA), Physical layer procedures (3GPP TS 36.213 version 8.8.0 Release 8), Oct. 2009, pp. 1-79.
International Search Report and Written Opinion—PCT/US2018/012550—ISA/EPO—dated Jul. 17, 2018.
Partial International Search Report—PCT/US2018/012550—ISA/EPO—dated May 25, 2018.
Taiwan Search Report—TW107100729—TIPO—dated Sep. 19, 2021.

* cited by examiner

SELECTION OF MODULATION AND CODING SCHEME

CROSS-REFERENCE TO RELATED APPLICATIONS

The present Application for Patent is a Divisional of patent application Ser. No. 15/799,813 entitled "Selection of Modulation and Coding Scheme" filed Oct. 31, 2017, pending, which claims the benefit of U.S. Provisional Application No. 62/448,188, entitled "Selection of Modulation and Coding Scheme", filed Jan. 19, 2017, each of which are assigned to the assignee hereof, and expressly incorporated herein by reference in its entirety.

INTRODUCTION

Aspects of this disclosure relate generally to telecommunications, and more particularly to selection of a modulation and coding scheme (MCS).

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In 3GPP, the network may transmit downlink control information (DCI) to a user equipment (UE). The DCI may include, among other data, a modulation and coding scheme index $I_{MCS}$ indicating a particular modulation and coding scheme (sometimes abbreviated as "MCS"), and a resource block assignment. The UE may be equipped with a standardized lookup table that enables it to derive an order of modulation ($Q_m$) and a transport block size (TBS) based on the DCI (for example, see Tables 8.6.1-1 and 7.1.7.2.1-1 of 3GPP Technical Specification (TS) 36.213, version 8.8.0). The UE may also be subjected to power restrictions that vary based on the $I_{MCS}$ and the resource block assignment. For example, if the DCI indicates a particular $Q_m$ and a particular resource block assignment, the UE may be constrained to a particular range of maximum power reduction (MPR) (see, for example, Table 6.2.3 of 3GPP TS 36.101 version 13.3.0).

As technology evolves in unforeseen directions, standardized lookup tables may restrain innovation by limiting the network to particular combinations of, for example, $Q_m$, TBS, and MPR. When new techniques are employed, the optimal combination of $Q_m$, TBS, and MPR is increasingly likely to differ from the combinations provided in the standardized lookup tables.

In view of the foregoing, new solutions are needed for indicating an optimal value for TBS, especially in combination with other optimal values of, for example, $Q_m$ and MPR. Ideally, these new solutions would not require a complete redesign of the standardized lookup tables that have already been programmed into many existing UEs.

SUMMARY

The following summary is an overview provided solely to aid in the description of various aspects of the disclosure and is provided solely for illustration of the aspects and not limitation thereof.

In one example, a method is disclosed. The method may comprise, for example, receiving control information, identifying a change indicator, determining a first MCS based on the control information, and modifying the first MCS based on the change indicator to determine a second MCS.

In another example, a User Equipment (UE) is disclosed. The UE may comprise, for example, at least one transceiver, memory configured to store data and/or instructions, and at least one processor coupled to the transceiver and the memory. The at least one processor may be configured to receive control information, identify a change indicator, determine a first MCS based on the control information, and modify the first MCS based on the change indicator to determine a second MCS.

In yet another example, another UE is disclosed. The UE may comprise, for example, means for receiving control information, means for identifying a change indicator, means for determining a first MCS based on the control information, and means for modifying the first MCS based on the change indicator to determine a second MCS.

In yet another example, a non-transitory computer-readable medium is disclosed. The non-transitory computer-readable medium may comprise, for example, code for receiving control information, code for identifying a change indicator, code for determining a first MCS based on the control information, and code for modifying the first MCS based on the change indicator to determine a second MCS.

In yet another example, another method is disclosed. The method may comprise, for example, transmitting control information to a UE, wherein the control information enables the UE to determine a first MCS based on the control information, identify a change indicator, and modify the first MCS based on the change indicator to determine a second MCS.

In yet another example, an evolved NodeB (eNB) is disclosed. The eNB may comprise, for example, at least one transceiver, memory configured to store data and/or instructions, and at least one processor coupled to the transceiver and the memory. The at least one processor may be configured to transmit control information to a UE, wherein the control information enables the UE to determine a first MCS based on the control information, identify a change indicator, and modify the first MCS based on the change indicator to determine a second MCS.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

As noted above, new solutions are needed for indicating an optimal value for TBS, especially in combination with other optimal values of, for example, $Q_m$ and MPR. Ideally, these new solutions would not require a complete redesign of the standardized lookup tables that have already been programmed into many existing UEs.

In accordance with aspects of the disclosure, a network may select an optimal modulation and coding scheme for a particular UE. The optimal modulation and coding scheme may be characterized by a set of MCS factors such as TBS, $Q_m$, and MPR (as noted above). The network may be configured to flexibly indicate the optimal modulation and coding scheme to the particular UE, even in the event that the optimal combination of MCS factors is not provided in the standardized lookup table.

In some implementations, the network achieves this by providing an additional information element, or field, in the control information transmitted to the UE. For example, the DCI (for example, as specified in § 5.3.3 of 3GPP TS 36.212, version 8.8.0) may provide the MCS-related information that is conventionally provided in DCI, However, the DCI may be modified, in accordance with aspects of the present disclosure, to include a change indicator field that explicitly indicates a particular modification of one or more MCS factors. The network may be configured to populate the change indicator field and transmit the control information. The UE may be configured to receive the control information and derive a modification of one or more MCS factors based on the populated change indicator field.

In other implementations, the network may use existing control information to implicitly indicate a modification of one or more MCS factors. For example, the UE may be configured to use a first modulation and coding scheme if the existing control information meets a first set of criteria, a second modulation and coding scheme if the existing control information meets a second set of criteria, etc.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Figure 1:
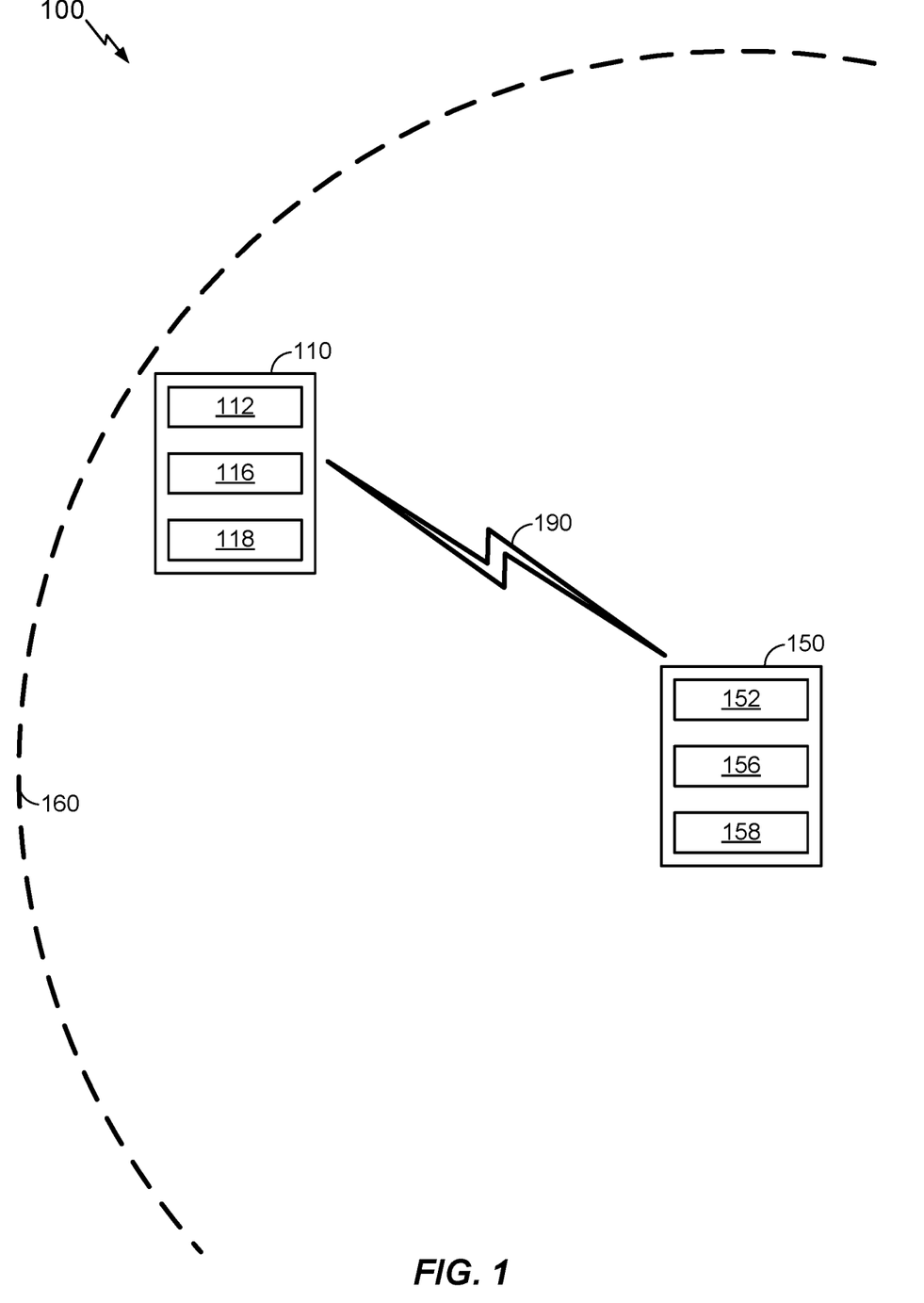
FIG. 1 illustrates an example wireless communication system including a user equipment (UE) in communication with a network.

FIG. 1 illustrates an example wireless communication system 100 including a UE 110 in communication with a network 150. Unless otherwise noted, the terms "UE" and "network" are not intended to be specific or limited to any particular Radio Access Technology (RAT). The UE 110 may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), an Access Terminal (AT), etc. Similarly, the network 150 may operate according to one or several RATs in communicating with UEs depending on the network in which the access point is deployed, and may be alternatively referred to as a Base Station (BS), a Network Node, a NodeB, an evolved NodeB (eNB), an Access Point (AP), etc.

In the example of FIG. 1, the UE 110 and the network 150 communicate via a wireless link 190. The network 150 may be associated with one or more cells. The one or more cells may have a cell edge 160. The wireless link 190 may be established whenever the UE 110 is within the cell edge 160. The wireless link 190 may be used to communicate signals on one or more frequencies using one or more RATs.

The UE 110 may include a UE transceiver 112, a UE processor 116, and a UE memory 118. The UE transceiver 112 may include, for example, one or more antennas configured to transmit and/or receive a signal via the wireless link 190. In some implementations, the UE processor 116 may consist of a single host processor or application-specific integrated circuit (ASIC) configured to perform all the processing tasks of the UE 110. In other implementations, the UE processor 116 may include a plurality of processors and/or ASICs. The plurality of processors and/or ASICs may be configured to perform redundant processing tasks. Additionally or alternatively, each of the plurality of processors and/or ASICs may be associated with a specific subset of processing tasks. For example, one of the plurality of processors or ASICs that make up the UE processor 116 may be configured to encode a signal (e.g., a message, an indication, data, etc.) and provide the encoded signal to the UE transceiver 112. Conversely, one of the plurality of processors or ASICs may be configured to decode a signal received by the UE transceiver 112. The encoding and decoding may be performed based on one or more RATs. In some implementations, the UE memory 118 may consist of a single host memory configured to store all data associated with the UE 110. In other implementations, the UE memory 118 includes a plurality of memories. The UE memory 118 may include a transitory or non-transitory computer-readable medium configured to store data, instructions, or any combination thereof. The instructions may be configured to cause the UE processor 116 to perform one or more processing tasks, which may in turn cause the UE transceiver 112 to perform one or more transmitting and/or receiving tasks.

The network 150 may include a network transceiver 152, a network processor 156, and a network memory 158. The network transceiver 152 may include, for example, one or more antennas configured to transmit and/or receive a signal via the wireless link 190. In some implementations, the network processor 156 may consist of a single host processor or application-specific integrated circuit (ASIC) configured to perform all the processing tasks of the network 150. In other implementations, the network processor 156 may include a plurality of processors and/or ASICs. The plurality of processors and/or ASICs may be configured to perform redundant processing tasks. Additionally or alternatively, each of the plurality of processors and/or ASICs may be associated with a specific subset of processing tasks. For example, one of the plurality of processors or ASICs that make up the network processor 156 may be configured to encode a signal (e.g., a message, an indication, data, etc.) and provide the encoded signal to the network transceiver 152. Conversely, one of the plurality of processors or ASICs may be configured to decode a signal received by the network transceiver 152. The encoding and decoding may be performed based on one or more RATs. In some implementations, the network memory 158 may consist of a single host memory configured to store all data associated with the network 150. In other implementations, the network memory 158 includes a plurality of memories. The network memory 158 may include a transitory or non-transitory computer-readable medium configured to store data, instructions, or any combination thereof. The instructions may be configured to cause the network processor 156 to perform one or more processing tasks, which may in turn cause the network transceiver 152 to perform one or more transmitting and/or receiving tasks.

Figure 2:
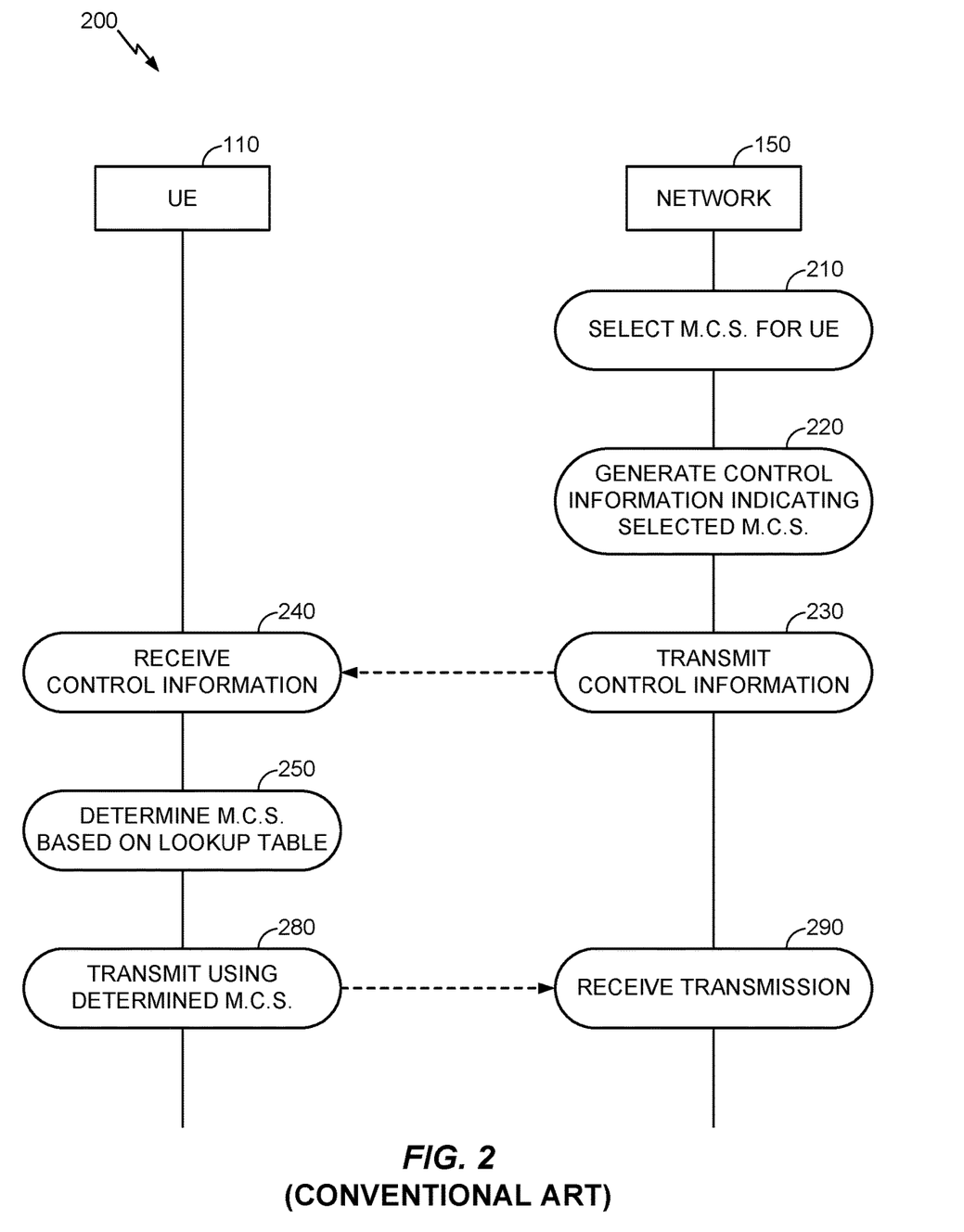
FIG. 2 generally illustrates a signal flow diagram for selecting and indicating a modulation and coding scheme within the wireless communication system of FIG. 1 in accordance with conventional techniques.

FIG. 2 generally illustrates a signal flow diagram 200 for selecting and indicating a modulation and coding scheme in accordance with conventional techniques.

At 210, a network analogous to the network 150 depicted in FIG. 1 selects a modulation and coding scheme for a particular UE. The modulation and coding scheme may be characterized by a plurality of MCS factors, for example, a number of spatial streams, an order of modulation ($Q_m$, as noted above), a coding rate, a data rate, a transport block size (TBS, as noted above), a maximum power reduction (MPR, as noted above), or any combination thereof. The data rate may be associated with a particular guard interval and a particular channel width.

The selecting at 210 may be constrained to a finite set of particular MCS factor combinations. The finite set may be standardized in a lookup table. The network 150 may indicate a particular combination of MCS factors by referencing, for example, a particular row of the standardized lookup table. The UE 110, which is equipped with the same standardized lookup table, may determine the indicated modulation and coding scheme by reference to the indicated row.

If the optimal combination of MCS factors is not among the schemes specified in the standardized lookup tables, then the network 150 has no way to indicate the optimal scheme. As a substitute, the network 150 must select and indicate a non-optimal scheme.

As an example of a non-optimal scheme, consider a scenario in which the UE 110 is located at a cell edge 160. In this scenario, the optimal transmission scheme may involve Transmission Time Interval (TTI) bundling. TTI bundling is a technique in which a UE may transmit a particular transport block in a first subframe, and then, without waiting for a hybrid automatic repeat request (HARQ) acknowledgement (ACK/NACK), immediately retransmit the transport block in successive second, third, and fourth subframes. For TTI bundling, the optimal modulation may be QPSK ($Q_m$=2), and the number of physical resource blocks may be one ($N_{PRB}$=1). Table 7.1.7.2.1-1 (a lookup table standardized in 3GPP TS 36.213, version 8.8.0) contains hundreds of TBS values. However, only a few (for example, ten) may be associated with QPSK and a single physical resource block. Using standardized lookup tables, there is no way to indicate $Q_m$=2 and $N_{PRB}$=1 while maintaining the flexibility to choose an optimal TBS value. As a result, the network 150 and UE 110 may be forced to use a non-optimal combination of MCS factors (for example, $Q_m$=2, $N_{PRB}$=1, and one of the ten available TBSs).

Returning to the signal flow diagram 200 depicted in FIG. 2, recall that at 210, the network 150 selects a modulation and coding scheme for a particular UE.

At 220, the network 150 may generate control information indicating the selected modulation and coding scheme.

At 230, the network 150 may transmit the control information generated at 220 to the UE 110. The transmitting at 230 may use a wireless link analogous to the wireless link 190 depicted in FIG. 1.

At 240, the UE 110 may receive the control information transmitted at 230.

At 250, the UE 110 may determine the modulation and coding scheme (i.e., the scheme selected by the network 150 at 210) by reference to a lookup table. As noted above, the lookup table may be a standardized lookup table that includes a finite set of modulation and coding schemes, each scheme corresponding to a particular combination of MCS factors. As a result, the modulation and coding scheme selected by the network 150 may be optimal or non-optimal.

At 280, the UE 110 transmits using the modulation and coding scheme determined at 250. The transmitting at 280 may use a wireless link analogous to the wireless link 190 depicted in FIG. 1.

At 290, the network 150 may receive the transmission that was transmitted at 280.

For purposes of illustration, a particular implementation of the signal flow diagram 200 depicted in FIG. 2 will be discussed in greater detail below. By reference to 3GPP standards 36.101 and 36.213, it will be observed that a particular wireless standard such as 3GPP may be associated with inherent constraints, especially when attempting to use techniques such as TTI bundling.

The modulation and coding scheme selected at 210 may be a 3GPP modulation and coding scheme. The control information generated at 220 may be DCI analogous to, for example, the DCI specified in § 5.3.3 of 3GPP TS 36.212, version 8.8.0. The DCI may include, among other data, a modulation and coding scheme index $I_{MCS}$ and a resource block assignment. At 250, the UE 110 may derive a particular modulation order $Q_m$ based on the modulation and coding scheme index $I_{MCS}$. To perform the derivation, the UE 110 may consult a standardized table, in particular, Table 8.6.3-1 of 3GPP TS 36.213, version 8.8.0. The $I_{MCS}$ may be an integer value between 0 and 31, and each value of the modulation and coding scheme index $I_{MCS}$ may correspond to a particular modulation order $Q_m$ (two, four, or six). A modulation order of two may correspond to Quadrature Phase Shift Keying (QPSK), a modulation order of four may correspond to 16-Quadrature Amplitude Modulation (16-QAM), and a modulation order of six may correspond to 64-QAM.

The UE 110 may also derive a TBS from the DCI. The modulation and coding scheme index $I_{MCS}$ may correspond to a particular TBS index $I_{TBS}$. The UE 110 may then use the TBS index $I_{MCS}$ and a physical resource block number $N_{PRB}$ derived from the resource block assignment to derive the TBS. To perform the derivation, the UE 110 may consult a standardized table, in particular, Table 7.1.7.2.1-1 of 3GPP TS 36.213, version 8.8.0.

As a particular example, suppose that the DCI indicates a modulation and coding scheme index value of $I_{MCS}$=19 and includes a resource block assignment from which the UE 110 derives a physical resource block number value of $N_{PRB}$=9. Using Table 8.6.3-1, the UE 110 may derive a modulation order value of $Q_m$=4 and a TBS index value of $I_{TBS}$=18 (both of which correspond to the modulation and coding scheme index value of $I_{MCS}$=19). Then, using Table 7.1.7.2.1-1, the UE 110 may derive a TBS value of TBS=3624 (which corresponds to the TBS index value of $I_{TBS}$=18 and the physical resource block number value of $N_{PRB}$=9). The UE 110 may then transmit using a modulation and coding scheme associated with the modulation order value of $Q_m$=4, the physical resource block number value of $N_{PRB}$=9, and the TBS value of TBS=3624.

In some scenarios, for example, at a cell edge analogous to the cell edge 160 depicted in FIG. 1, a modulation order value of $Q_m$=4, a physical resource block number of $N_{PRB}$=9, and a TBS value of TBS=3624 may not be optimal. Performance may be improved by using TTI bundling, i.e., a modulation order value of $Q_m$=2, and a physical resource block number of $N_{PRB}$=1. But when adopting these values, the choice of TBS is restricted.

Power restrictions raise additional issues. In the cell-edge scenario described above, it may be optimal to select a maximum power reduction value of MPR=0 dB. However, as will be understood from, for example, Table 6.2.3 of 3GPP TS 36.101 version 13.3.0, for a modulation order value of $Q_m$=2 (corresponding to QPSK), the physical resource block number value must be greater than four. Accordingly, the optimal combination of MPR=0 dB, $N_{PRB}$=1, and $Q_m$=2 cannot be indicated using the conventional approach depicted in FIG. 2. Instead, the network 150 may select a modulation order value of $Q_m$=2, or may select a physical resource block number value of $N_{PRB}$=1, but is restricted from selecting both because there is no way to indicate the particular selected combination to the UE 110 using standardized tables.

Figure 3:
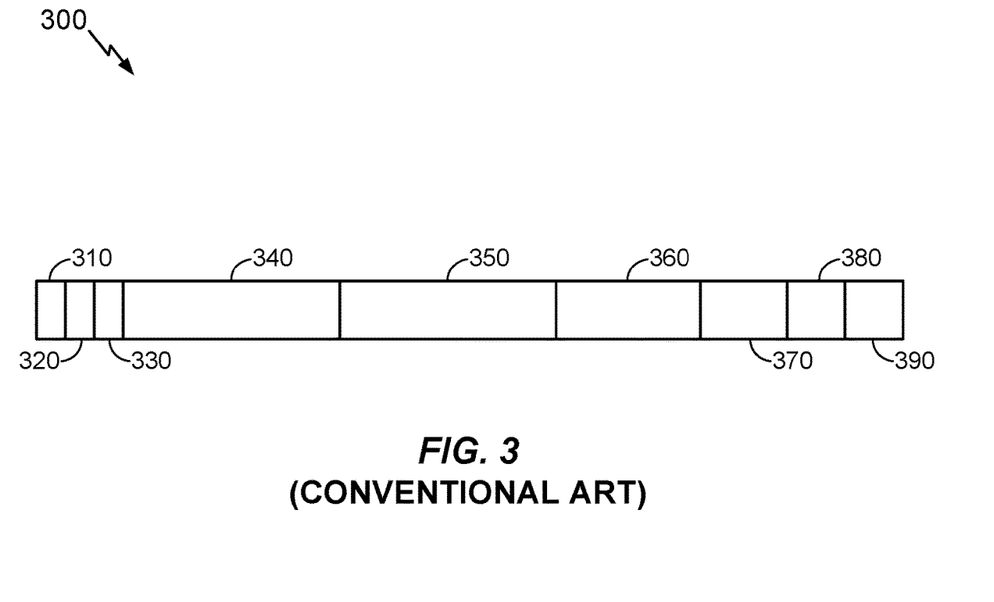
FIG. 3 generally illustrates an example format for a DCI signal in accordance with conventional techniques.

FIG. 3 generally illustrates an example format for a DCI signal 300 in accordance with conventional techniques. In the example depicted in FIG. 3, the DCI signal 300 includes a plurality of information elements 310-390. The plurality of information elements 310-390 may include a format flag 310, a Virtual Resource Block (VRB) assignment flag 320, an N gap indicator 330, a localized distributed resource block (DRB) resource block assignment 340, a distributed DRB resource block assignment 350, an MCS indicator 360, a HARQ process indicator 370, a redundancy version indicator 380, and a transmit power control indicator 390.

It will be understood that the DCI signal 300 is presented as an example and that a DCI may be transmitted in formats that differ from the DCI signal 300. The particular format of the DCI may be indicated in the format flag 310. The present disclosure does not concern the contents of the VRB assignment flag 320, N gap indicator 330, HARQ process indicator 370, redundancy version indicator 380, and transmit power control indicator 390. For brevity, these information elements will not be further described herein.

The UE 110 may determine the value of $I_{MCS}$ based on the MCS indicator 360 depicted in FIG. 3. In some implementations, the MCS indicator 360 includes five bits. As noted above, the UE 110 may use Table 8.6.1-1 to determine a modulation order $Q_m$ and a TBS index $I_{TBS}$ based on the modulation and coding scheme index $I_{MCS}$.

As elsewhere noted, the UE 110 may use Table 7.1.7.2.1-1 to determine a transport block size TBS based on the TBS index $I_{TBS}$ and the physical resource block number $N_{PRB}$. The UE 110 may determine the value of the TBS index $I_{TBS}$ as described above (based on the MCS indicator 360). The UE 110 may determine the value of the physical resource block number $N_{PRB}$ based on one or more of the localized DRB resource block assignment 340 and the distributed DRB resource block assignment 350 depicted in FIG. 3. In some implementations, the localized DRB resource block assignment 340 and the distributed DRB resource block assignment 350 vary in size, but may include between five and thirteen bits.

Figure 4:
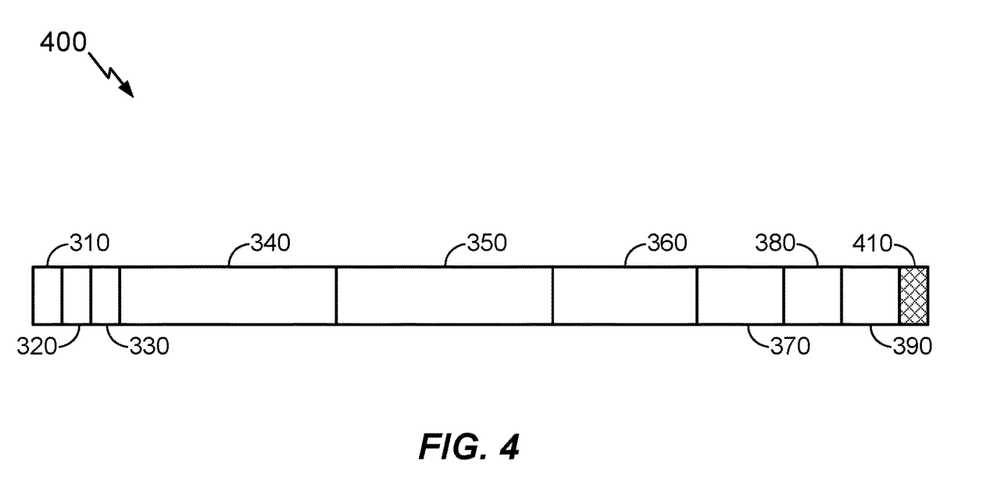
FIG. 4 generally illustrates an example format for a DCI signal in accordance with aspects of the disclosure.

FIG. 4 generally illustrates an example format for a DCI signal 400 in accordance with aspects of the disclosure. The DCI signal 400 may include a plurality of information elements 310-390 analogous to the format flag 310, VRB assignment flag 320, N gap indicator 330, localized DRB resource block assignment 340, distributed DRB resource block assignment 350, MCS indicator 360, HARQ process indicator 370, redundancy version indicator 380, and transmit power control indicator 390 depicted in FIG. 3.

Unlike the DCI signal 300 that is transmitted in accordance with conventional techniques, the DCI signal 400 further includes a change indicator field 410. Although the change indicator field 410 is depicted at the end of the DCI signal 400, it will be understood that the change indicator field 410 may be located anywhere in the DCI signal 400, or anywhere in any other suitable control signal. As will be discussed in greater detail below, the change indicator field 410 may enable the network 150 to flexibly indicate a particular modulation and coding scheme to the UE 110.

A repetition number parameter may be explicitly provided in the DCI signal 400, for example, as a component of one of the information elements 310-390 of the DCI signal 400 depicted in FIG. 4, explicitly provided in a separate information element of the DCI signal 400 (not depicted in FIG. 4), or derived from data provided in one of the information elements 310-390 of the DCI signal 400 depicted in FIG. 4.

The network 150 may enable the change indicator field 410 by adding it to the DCI signal 400 using a radio resource control (RRC) reconfiguration. The RRC reconfiguration may be responsive to one or more measurement reports received from the UE 110. For example, the measurement reports may indicate low received signal strength (RSSI), voice jitter, low reference signal reception power (RSRP), low signal-to-noise ratio (SNR), etc. In some implementations, the change indicator field 410 may be implicitly enabled by reconfiguring the UE in a specific mode where Physical Uplink Shared Channel (PUSCH) repetitions are used.

Figure 5:
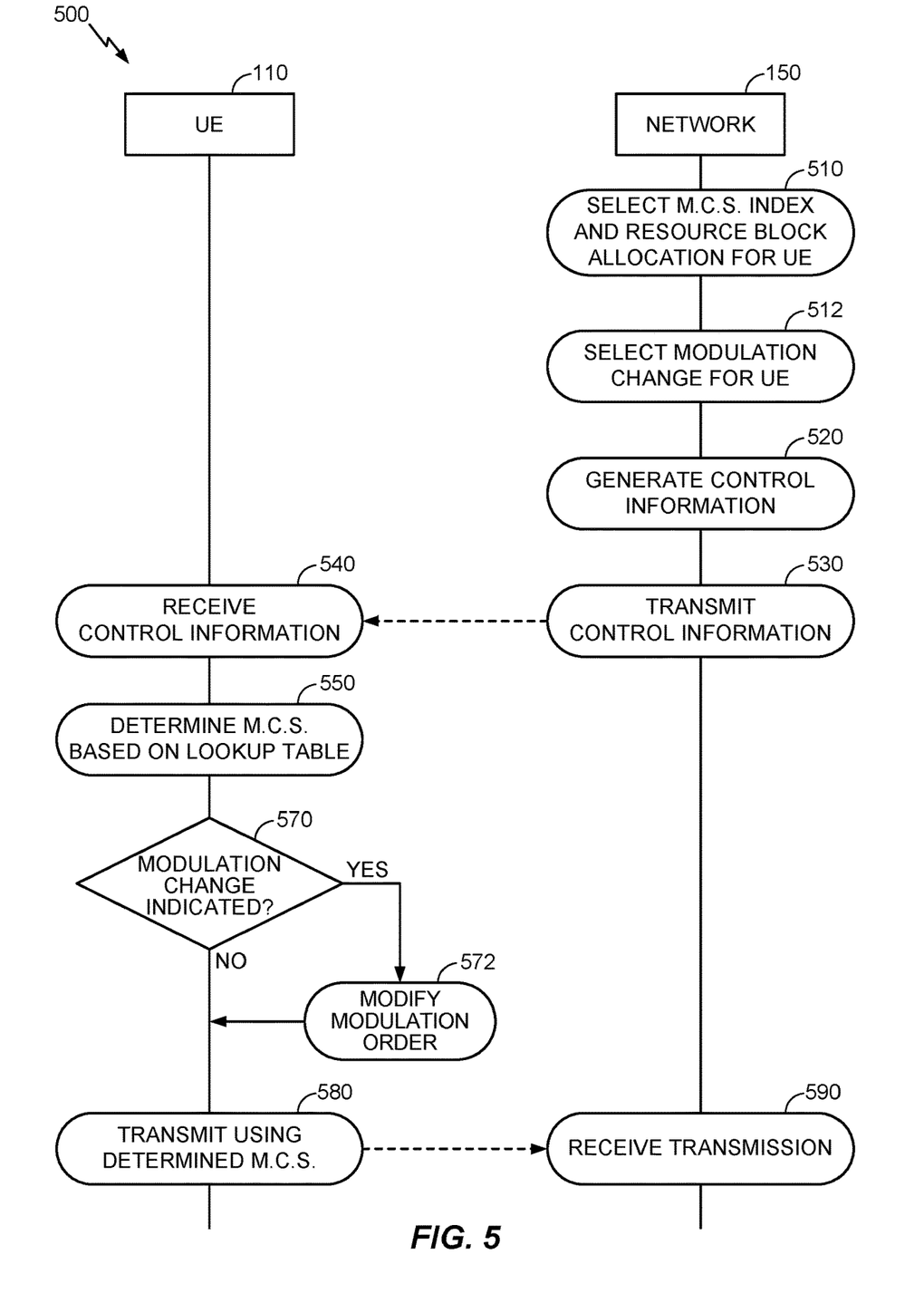
FIG. 5 generally illustrates a signal flow diagram for selecting and indicating a modulation and coding scheme in accordance with aspects of the disclosure.

FIG. 5 generally illustrates a signal flow diagram 500 for selecting and indicating a modulation and coding scheme in accordance with aspects of the disclosure.

At 510, a network analogous to the network 150 depicted in FIG. 1 selects a modulation and coding scheme index $I_{MCS}$ and a resource block allocation for the UE 110.

At 512, the network 150 selects a change indicator for the UE 110. As will be understood from FIG. 5, the change indicator may take the specific form of a modulation change indicator.

The selecting at 510 may be analogous in some respects to the selecting 210 depicted in the conventional approach of FIG. 2. However, the selecting at 512 is absent from the conventional approach.

At 520, the network 150 may generate control information. In some implementations, the control information generated at 520 may have a format similar to the DCI signal 400 depicted in FIG. 4. However, it will be understood that the network 150 may select any suitable signals or signal format that indicates the modulation and coding scheme index $I_{MCS}$, resource block allocation, and modulation change.

At 530, the network 150 may transmit the control information generated at 520 to the UE 110. The transmitting at 530 may use a wireless link analogous to the wireless link 190 depicted in FIG. 1.

At 540, the UE 110 may receive the control information transmitted at 530.

At 550, the UE 110 may determine the modulation and coding scheme (i.e., the modulation and coding scheme selected by the network 150 at 510) based on a lookup table. In particular, the UE 110 may determine a first modulation order $Q_{m1}$, a physical resource block number $N_{PRB}$, and a transport block size TBS based on the DCI signal 400 (i.e., the modulation and coding scheme index $I_{MCS}$ derived from the MCS indicator 360 and the resource block allocation derived from the localized DRB resource block assignment 340 and/or the distributed DRB resource block assignment 350). It will be understood that the determining at 550 may be analogous in some respects to the determining at 250 depicted in the conventional approach of FIG. 2.

At 570, the UE 110 may determine whether the control information received at 540 indicates a modulation change. In response to a determination that a modulation change is indicated ('yes' at 570), the signal flow diagram 500 may proceed to 572. In response to a determination that a modulation change is not indicated ('no' at 570), the signal flow diagram 500 may omit 572 and proceed to 580.

At 572, the UE 110 may modify the modulation order based on the change indicator field 410. In particular, the UE 110 may, in response to a determination that a modulation change is indicated ('yes' at 570), modify the modulation order $Q_m$ from a first modulation order $Q_{m1}$ (determined at 550 using the standardized lookup table) to a second modulation order $Q_{m2}$ (determined at 572). In response to a determination that a modulation change is not indicated ('no' at 570), the UE 110 may omit the modifying at 572 (i.e., $Q_{m2}=Q_{m1}$).

The change indicator field 410 may be implemented in any suitable manner In some implementations, the change indicator field 410 may be populated with a one-bit value. For example, the value '0' may indicate no change to the modulation order determined at 550 (i.e., $Q_{m2}=Q_{m1}$), and the value '1' may indicate that the modulation order $Q_{m1}$ determined at 550 should be decremented (i.e., $Q_{m2}=Q_{m1}-2$). For example, if the modulation order determined at 550 is $Q_{m1}=6$ (64-QAM), then the value of $Q_{m2}$ should be set to 4 (16-QAM), whereas if the modulation order determined at 550 is $Q_{m1}=4$ (16-QAM), then the value of $Q_{m2}$ should be set to 2 (QPSK).

In other implementations, the value '0' may indicate no change to the modulation order determined at 550 ($Q_{m2}=Q_{m1}$, as noted above), and the value '1' may indicate that the modulation order determined at 550 should be set to a particular modulation order, for example, $Q_{m2}=2$ (QPSK).

In yet other implementations, the change indicator field 410 may be populated with a multi-bit value. For example, the value '00' may indicate no change to the modulation order determined at 550 ($Q_{m2}=Q_{m1}$, as noted above), the value '01' may indicate a change to a modulation order value of $Q_{m2}=2$, the value '10' may indicate a change to a modulation order value of $Q_{m2}=4$, and the value '11' may indicate a change to a modulation order value of $Q_{m2}=6$.

At 580, the UE 110 transmits using the modulation and coding scheme that is determined at 550 and (in some scenarios) modified at 572. The transmitting at 580 may use a wireless link analogous to the wireless link 190 depicted in FIG. 1.

At 590, the network 150 may receive the transmission that was transmitted at 580.

Figure 6:
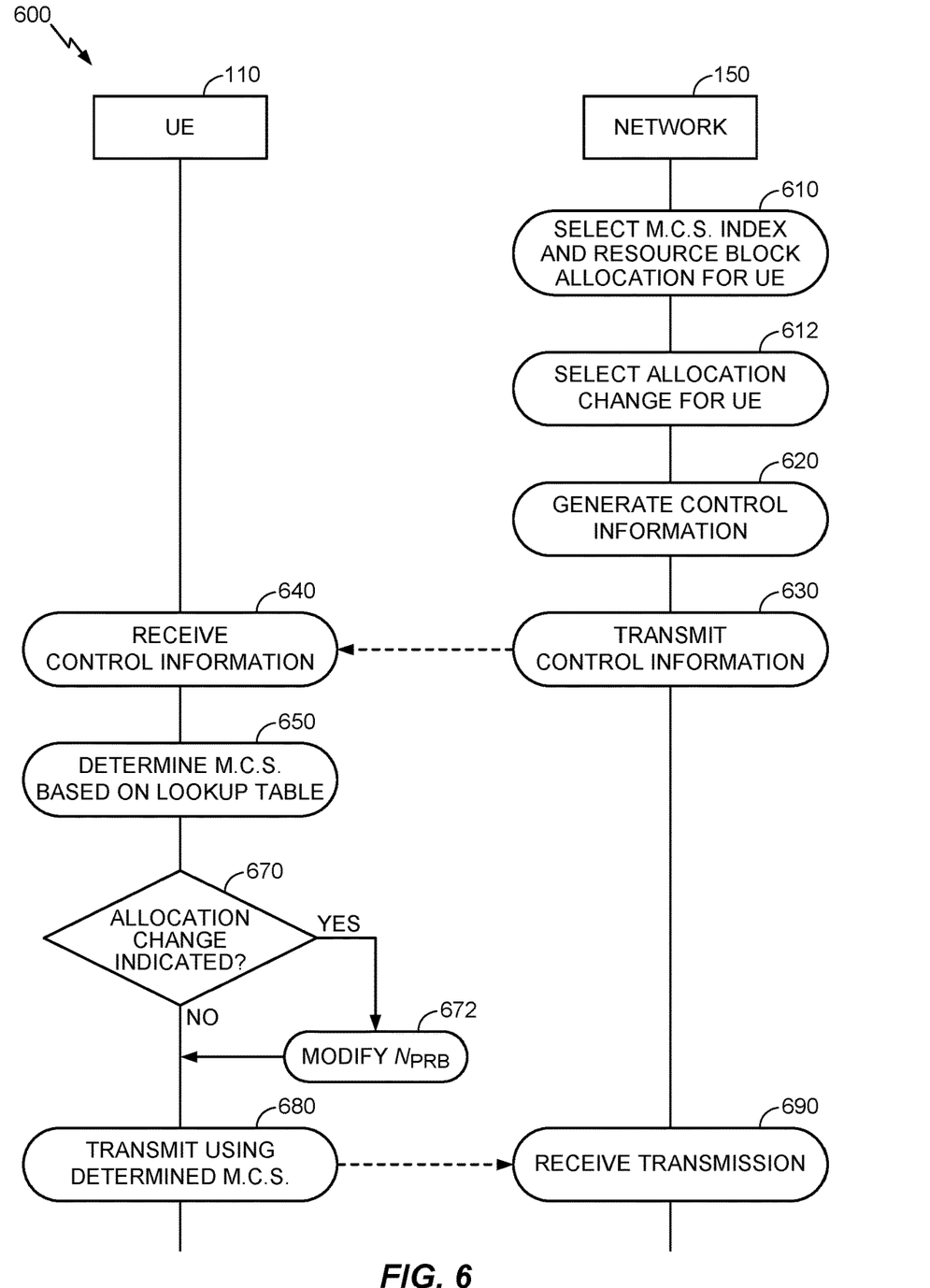
FIG. 6 generally illustrates another signal flow diagram for selecting and indicating a modulation and coding scheme in accordance with other aspects of the disclosure.

FIG. 6 generally illustrates a signal flow diagram 600 for selecting and indicating a modulation and coding scheme in accordance with other aspects of the disclosure.

At 610, a network analogous to the network 150 depicted in FIG. 1 selects a modulation and coding scheme index $I_{MCS}$ and a resource block allocation for the UE 110.

At 612, the network 150 selects an allocation change for the UE 110. As will be understood from FIG. 6, the change indicator may take the specific form of an allocation change indicator.

The selecting at 610 may be analogous in some respects to the selecting 210 depicted in the conventional approach of FIG. 2. However, the selecting at 612 is absent from the conventional approach.

At 620, the network 150 may generate control information. In some implementations, the control information generated at 620 may have a format similar to the DCI signal 400 depicted in FIG. 4 (wherein the allocation change is indicated using the change indicator field 410). However, it will be understood that the network 150 may select any suitable signals or signal format that indicates the modulation and coding scheme index $I_{MCS}$, resource block allocation, and allocation change.

At 630, the network 150 may transmit the control information generated at 620 to the UE 110. The transmitting at 630 may use a wireless link analogous to the wireless link 190 depicted in FIG. 1.

At 640, the UE 110 may receive the control information transmitted at 630.

At 650, the UE 110 may determine the modulation and coding scheme (i.e., the modulation and coding scheme selected by the network 150 at 610) based on a lookup table. In particular, the UE 110 may determine a modulation order $Q_m$, a first physical resource block number $N_{PRB1}$, and a transport block size TBS based on the DCI signal 400 (i.e., the modulation and coding scheme index $I_{MCS}$ and the resource block allocation). It will be understood that the determining at 650 may be analogous in some respects to the determining at 250.

At 670, the UE 110 may determine whether the control information received at 640 indicates an allocation change. In response to a determination that an allocation change is indicated ('yes' at 670), the signal flow diagram 600 may proceed to 672. In response to a determination that an allocation change is not indicated ('no' at 670), the signal flow diagram 600 may omit 672 and proceed to 680.

At 672, the UE 110 may modify the number of physical resource blocks $N_{PRB}$ based on the change indicator field 410. In particular, the UE 110 may, in response to a determination that an allocation change is indicated ('yes' at 670), modify the physical resource block number $N_{PRB}$ from a first physical resource block number $N_{PRB1}$ (determined at 650 using the standardized lookup table) to a second physical resource block number $N_{PRB2}$ (determined at 672). In response to a determination that an allocation change is not indicated ('no' at 670), the UE 110 may omit the modifying at 672 (i.e., $N_{PRB2}=N_{PRB1}$).

The allocation change indicator may be implemented in any suitable manner In some implementations, the allocation change indicator may be populated with a one-bit value. For example, the value '0' may indicate no change to the physical resource block number $N_{PRB}$ determined at 650 ($N_{PRB2}=N_{PRB1}$, as noted above), and the value '1' may indicate that the physical resource block number $N_{PRB1}$ determined at 650 should be decremented (i.e., $N_{PRB2}=N_{PRB1}-1$). For example, if the physical resource block number $N_{PRB1}$ determined at 650 is $N_{PRB1}=3$, then the value of $N_{PRB2}$ should be set to 2, whereas if the physical resource block number $N_{PRB1}$ determined at 650 is $N_{PRB1}=2$, then the value of $N_{PRB2}$ should be set to 1.

In other implementations, the value '0' may indicate no change to the physical resource block number $N_{PRB}$ determined at 650 ($N_{PRB2}=N_{PRB1}$, as noted above), and the value '1' may indicate that the physical resource block number $N_{PRB1}$ determined at 650 should be set to a particular value, for example, $N_{PRB2}=1$.

In yet other implementations, the allocation change field may be populated with a multi-bit value. For example, the value '000' may indicate no change to the physical resource block number $N_{PRB1}$ determined at 650 ($N_{PRB2}=N_{PRB1}$, as noted above), the value '001' may indicate a change to a value of $N_{PRB2}=1$, the value '010' may indicate a change to a value of $N_{PRB2}=2$, etc. It will be understood that the number of bits designated as the allocation change field may reflect the total number of physical resource block numbers.

At 680, the UE 110 transmits using the modulation and coding scheme that is determined at 650 and (in some scenarios) modified at 672. The transmitting at 680 may use a wireless link analogous to the wireless link 190 depicted in FIG. 1.

At 690, the network 150 may receive the transmission that was transmitted at 680.

Figure 7:
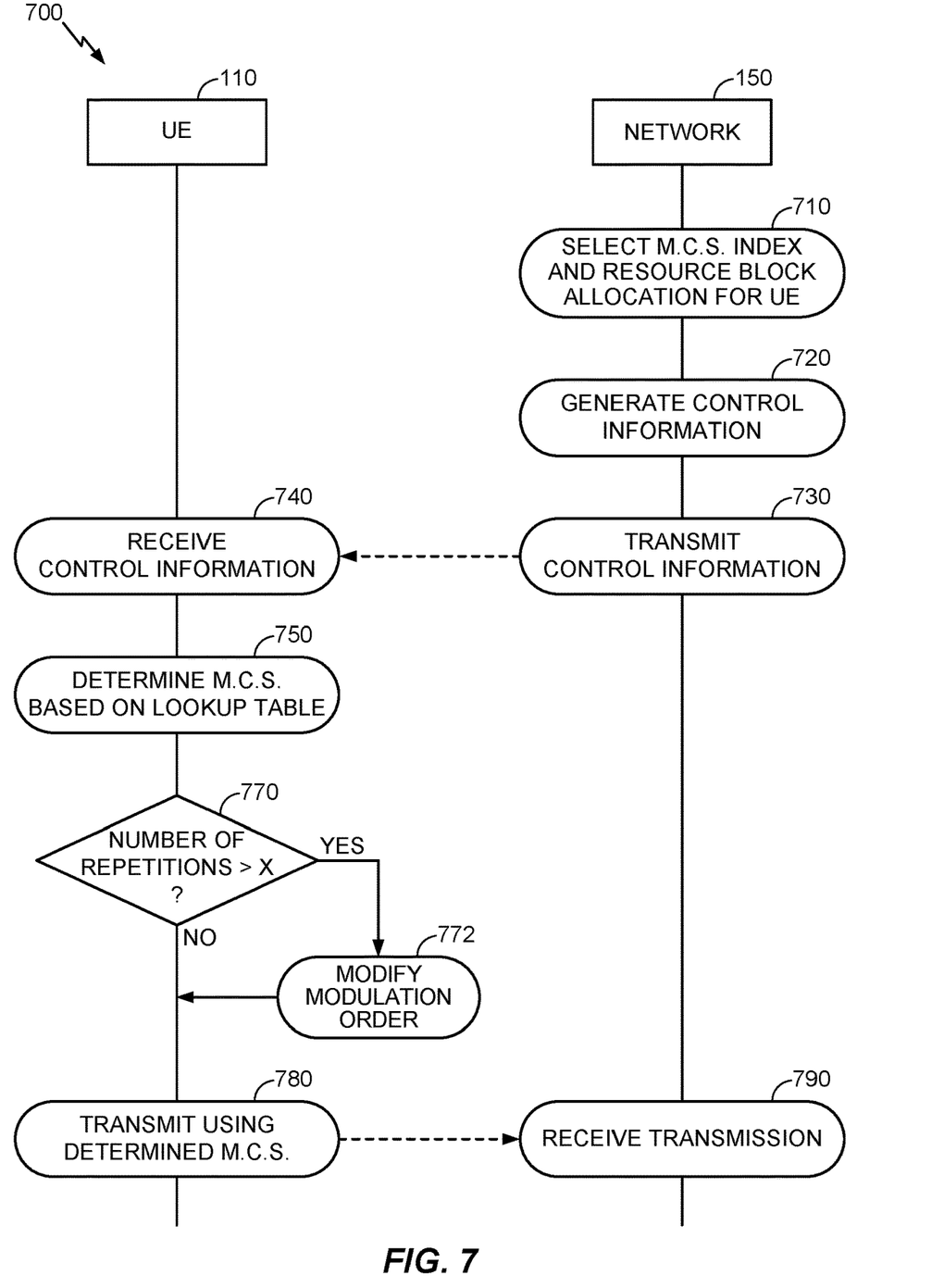
FIG. 7 generally illustrates yet another signal flow diagram for selecting and indicating a modulation and coding scheme in accordance with other aspects of the disclosure.

FIG. 7 generally illustrates a signal flow diagram 700 for selecting and indicating a modulation and coding scheme in accordance with aspects of the disclosure.

At 710, a network analogous to the network 150 depicted in FIG. 1 selects a modulation and coding scheme index $I_{MCS}$ and a resource block allocation for the UE 110. The selecting at 710 may be analogous in some respects to the selecting 210 depicted in the conventional approach of FIG. 2.

At 720, the network 150 may generate control information. In some implementations, the control information generated at 720 may have a format similar to the conventional DCI signal 300 depicted in FIG. 3. However, it will be understood that the network 150 may select any suitable signals or signal format that indicates the modulation and coding scheme index $I_{MCS}$ and resource block allocation. A repetition number parameter may be explicitly provided in the DCI, for example, as a component of one of the information elements 310-390 of the DCI signal 400 depicted in FIG. 4, explicitly provided in a separate information element of the DCI signal 400 (not depicted in FIG. 4), or derived from data provided in one of the information elements 310-390 of the DCI signal 400 depicted in FIG. 4.

At 730, the network 150 may transmit the control information generated at 720 to the UE 110. The transmitting at 730 may use a wireless link analogous to the wireless link 190 depicted in FIG. 1.

At 740, the UE 110 may receive the control information transmitted at 730.

At 750, the UE 110 may determine the modulation and coding scheme (i.e., the modulation and coding scheme selected by the network 150 at 710) based on a lookup table. In particular, the UE 110 may determine a modulation order $Q_m$, a physical resource block number $N_{PRB}$, and a transport block size TBS based on the conventional DCI signal 300.

It will be understood that the determining at 750 may be analogous in some respects to the determining at 250 depicted in the conventional approach of FIG. 2.

At 770, the UE 110 may determine whether the control information received at 740, or a repetition number parameter thereof, indicates a number of repetitions that is greater than a threshold number of repetitions (depicted in FIG. 7 as 'X'). As noted above, a repetition number parameter may be derived from data provided in one of the information elements 310-390 of the DCI signal 400 depicted in FIG. 4.

The threshold 'X' may be equal to, for example, two. In response to a determination that the control information indicates a number of repetitions above the threshold ('yes' at 770), the signal flow diagram 700 may proceed to 772. In response to a determination that the control information indicates a number of repetitions at or below the threshold ('no' at 770), the signal flow diagram 700 may omit 772 and proceed to 780.

At 772, the UE 110 may modify the modulation order based on the determination at 770. In particular, the UE 110 may, in response to a determination that the control information indicates a number of repetitions above the threshold ('yes' at 770), modify the modulation order $Q_m$ from a first modulation order $Q_{m1}$ (determined at 750 using the standardized lookup table) to a second modulation order $Q_{m2}$ (determined at 772). In response to a determination that the control information indicates a number of repetitions at or below the threshold ('no' at 770), the UE 110 may omit the modifying at 772 (i.e., $Q_{m2}=Q_{m1}$).

In some implementations, the modifying at 772 may include decrementing the modulation order $Q_{m1}$ (for example, $Q_{m2}=Q_{m1}-2$) or setting the modulation order to a particular value (for example, $Q_{m2}=2$).

At 780, the UE 110 transmits using the modulation and coding scheme that is determined at 750 and (in some scenarios) modified at 772. The transmitting at 780 may use a wireless link analogous to the wireless link 190 depicted in FIG. 1.

At 790, the network 150 may receive the transmission that was transmitted at 780.

In FIG. 7, the UE 110 modifies the modulation order $Q_m$ at 772. However, in other implementations (not depicted for brevity), the UE 110 may modify the resource allocation at 772. For example, the modifying at 772 may include decrementing the physical resource block number $N_{PRB}$ (for example, $N_{PRB2}=N_{PRB}-1$) or setting the modulation order to a particular value (for example, $N_{PRB2}=1$).

Figure 8:
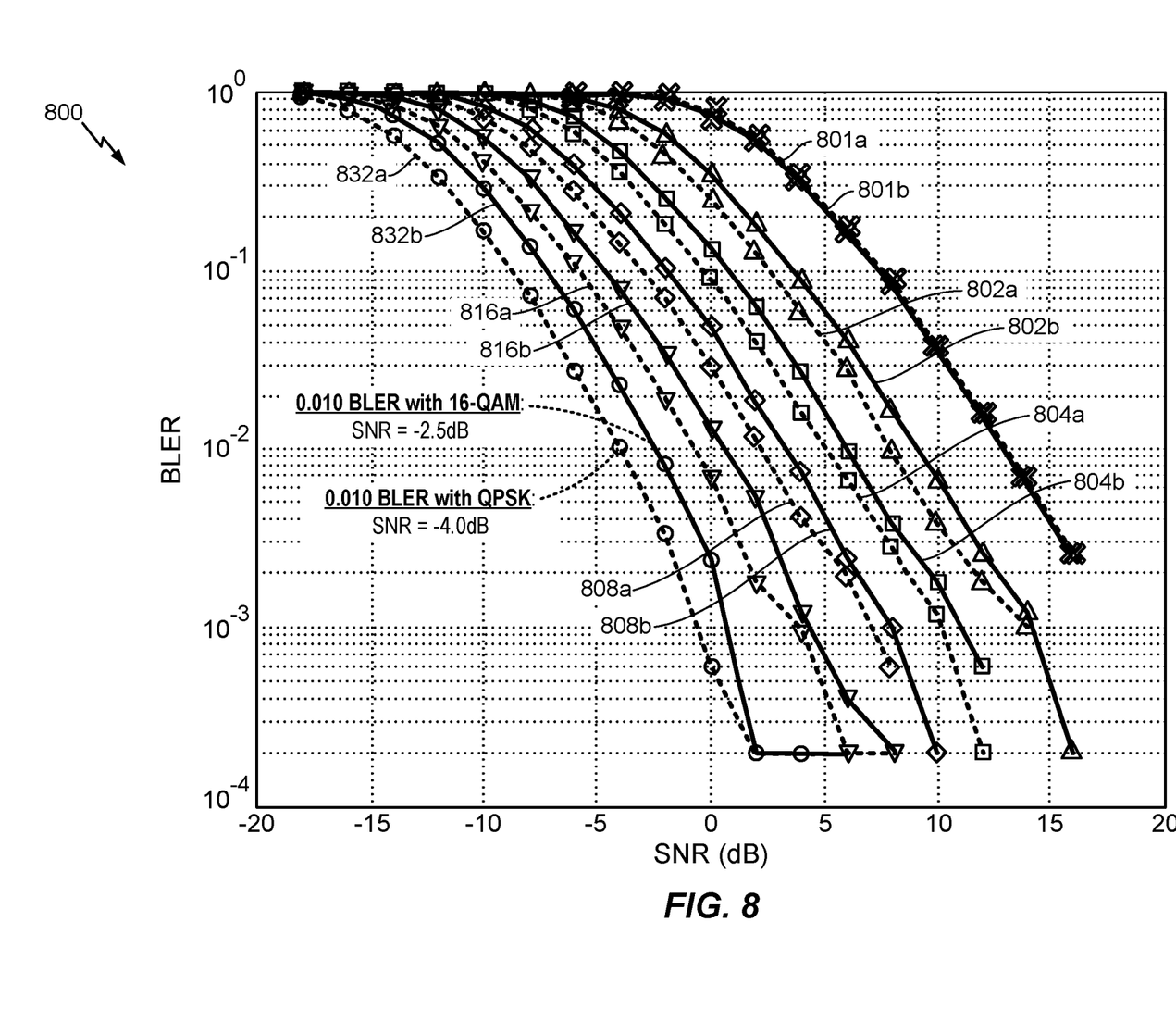
FIG. 8 generally illustrates an example of the benefits that may be obtained in accordance with aspects of the present disclosure.

FIG. 8 generally illustrates an example of the benefits that may be obtained in accordance with aspects of the present disclosure.

In a simulation, QPSK outperforms 16-QAM when using a TTI bundling method. The chart 800 includes a plurality of curves. The dashed curves correspond to QPSK ($Q_m=2$) and are labeled using numbers that end with the suffix "-a". The solid curves correspond to 16-QAM ($Q_m=4$) and are labeled using numbers that end with the suffix "-b".

In a first aspect of the simulation, a single retransmission was performed using the QPSK modulation scheme and then using the 16-QAM modulation scheme. The results are shown in QPSK curve 801a and 16-QAM curve 801b.

In a second aspect of the simulation, two retransmissions were performed using the QPSK modulation scheme and then using the 16-QAM modulation scheme. The results are shown in QPSK curve 802a and 16-QAM curve 802b.

In other aspects of the simulation, four retransmissions were performed, resulting in QPSK curve 804a and 16-QAM curve 804b, eight retransmissions were performed, resulting in QPSK curve 808a and 16-QAM curve 808b, sixteen retransmissions were performed, resulting in QPSK curve 816a and 16-QAM curve 816b, and thirty-two retransmissions were performed, resulting in QPSK curve 832a and 16-QAM curve 832b.

As will be understood from the chart 800, greater numbers of repetitions result in a better block error rate (BLER). In particular, the curves corresponding to higher numbers of repetitions (for example, curves 832a-832b) are associated with lower BLER when compared to the curves corresponding to lower number of repetitions (for example, curves 801a-801b).

As will be further understood from the chart 800, TTI bundling is best performed using QPSK rather than 16-QAM. In particular, a lower signal-to-noise ratio (SNR) is required to achieve the same block error rate (BLER). The effect is most evident when comparing the QPSK curve 832a to the 16-QAM curve 832b, although it is still evident as the number of repetitions increases to two retransmissions, four retransmissions, eight retransmissions, etc. In the chart 800, two points along the curves 832a-832b, respectively, have been labeled with their respective values. Both points correspond to a BLER of 0.010. The first point lies on the 16-QAM curve 832b, and corresponds to a SNR value of −2.5 dB. The second point lies on the QPSK curve 832a, and corresponds to a SNR value of −4.0 dB. By comparison to 16-QAM, QPSK enables the same BLER at lower SNR. Given that the UE 110 must consume resources in order to achieve SNR gains, it is evident that QPSK offers better results.

However, use of the standardized lookup tables in accordance with conventional techniques will often result in the use of 16-QAM, even in scenarios where QPSK offers better results (for example, in cases where TTI bundling is implemented). In accordance with aspects of the present disclosure, the network 150 has more flexibility when indicating a modulation and coding scheme. As a result, the UE 110 may be enabled to transmit using QPSK rather than 16-QAM, when appropriate.

The functionalities of the signal flow diagrams depicted in FIGS. 5-7 may be implemented in various ways consistent with the teachings herein. In some designs, the processes may be performed using one or more electrical components. In some designs, the processes may be performed using a processing system including one or more processor components. In some designs, the processes may be performed using, for example, at least a portion of one or more integrated circuits (e.g., an ASIC). As discussed herein, an integrated circuit may include a processor, software, other related components, or some combination thereof. Thus, the processes may be performed using, for example, different subsets of an integrated circuit, different subsets of a set of software modules, or a combination thereof. Also, it will be appreciated that a given subset (e.g., of an integrated circuit and/or of a set of software modules) may provide at least a portion of the functionality for more than one module.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a communication method.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for selecting a Modulation and Coding Scheme (MCS) performed by a user equipment (UE), comprising:
receiving control information from a base station, wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS;
determining, based on the MCS indicator, the first MCS from a lookup table of modulation and coding schemes, the first MCS associated with a first order of modulation; and
determining the second MCS based, at least in part, on the one bit of the change indicator, wherein the one bit indicates that the first order of modulation of the first MCS is to be decremented by one order of modulation to a second order of modulation for the second MCS.

2. The method of claim 1, wherein the one bit indicates that the first order of modulation of the first MCS is to be decremented to the second order of modulation for the second MCS; and wherein the determining the second MCS comprises:
setting the second MCS in accordance with the second order of modulation.

3. The method of claim 2, wherein the first order of modulation is 16 Quadrature Amplitude Modulation (QAM) or 64 QAM, and the second order of modulation is Quadrature Phase Shift Keying (QPSK) modulation or 16 QAM, respectively.

4. The method of claim 1, further comprising:
transmitting in accordance with the second MCS; and/or
receiving in accordance with the second MCS.

5. A User Equipment (UE), comprising:
at least one transceiver;
memory configured to store data and/or instructions; and
at least one processor coupled to the at least one transceiver and the memory, wherein the at least one processor is configured to:
receive control information from a base station, wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS;
determine, based on the MCS indicator, the first MCS from a lookup table of modulation and coding schemes, the first MCS associated with a first order of modulation; and
determine the second MCS based, at least in part, on the one bit of the change indicator, wherein the one bit indicates that the first order of modulation of the first MCS is to be decremented by one order of modulation to a second order of modulation for the second MCS.

6. The UE of claim 5, wherein the one bit indicates that the first order of modulation of the first MCS is to be decremented to the second order of modulation for the second MCS; and to determine the second MCS, the at least one processor is further configured to:
set the second MCS in accordance with the second order of modulation.

7. The UE of claim 5, wherein the at least one transceiver is configured to:
transmit in accordance with the second MCS; and/or
receive in accordance with the second MCS.

8. A User Equipment (UE), comprising:
means for receiving control information from a base station, wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS;
means for determining, based on the MCS indicator, the first MCS from a lookup table of modulation and coding schemes, the first MCS associated with a first order of modulation; and
means for determining the second MCS based, at least in part, on the one bit of the change indicator, wherein the one bit indicates that the first order of modulation of the first MCS is to be decremented by one order of modulation to a second order of modulation for the second MCS.

9. The UE of claim 8, wherein the one bit indicates that the first order of modulation of the first MCS is to be decremented to the second order of modulation for the second MCS; and the means for determining the second MCS comprises:
means for setting the second MCS in accordance with the second order of modulation.

10. A non-transitory computer-readable medium comprising at least one instruction as code for causing a processor of a user equipment (UE) to perform operations, the code comprising:
code for receiving control information from a base station, wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS;
code for determining, based on the MCS indicator, the first MCS from a lookup table of modulation and coding schemes, the first MCS associated with a first order of modulation; and
code for determining the second MCS based, at least in part, on the one bit of the change indicator, wherein the one bit indicates that the first order of modulation of the first MCS is to be decremented by one order of modulation to a second order of modulation for the second MCS.

11. The non-transitory computer-readable medium of claim 10, wherein the one bit indicates that the first order of modulation of the first MCS is to be decremented to the second order of modulation for the second MCS; and the code for determining the second MCS comprises:
code for setting the second MCS in accordance with the second order of modulation.

12. The non-transitory computer-readable medium of claim 10, wherein the control information includes a plurality of information elements, and the change indicator is derived from one or more parameters indicated by the control information.

13. A method of indicating a Modulation and Coding Scheme (MCS) performed by a base station, comprising:
   transmitting control information to a User Equipment (UE), wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS, and wherein the control information enables the UE to:
   determine, based on the MCS indicator, the first MCS from a lookup table of modulation and coding schemes, the first MCS associated with a first order of modulation; and
   determine the second MCS based, at least in part, on the one bit of the change indicator, wherein the one bit indicates that the first order of modulation of the first MCS is to be decremented by one order of modulation to a second order of modulation for the second MCS.

14. The method of claim 13, wherein the one bit indicates that the first order of modulation of the first MCS is to be decremented to the second order of modulation for the second MCS; and the change indicator indicates to the UE to:
   set the second MCS in accordance with the second order of modulation.

15. An evolved NodeB (eNB) that indicates a Modulation and Coding Scheme (MCS), the eNB comprising:
   at least one transceiver;
   memory configured to store data and/or instructions; and
   at least one processor coupled to the at least one transceiver and the memory, wherein the at least one processor is configured to:
   transmit control information to a User Equipment (UE), wherein the control information includes a plurality of information elements, the plurality of information elements comprising an MCS indicator and a change indicator, the change indicator explicitly provided in at least one information element of the plurality of information elements, the change indicator consisting of one bit for determining a second MCS based on a first MCS, and wherein the control information enables the UE to:
   determine, based on the MCS indicator, the first MCS from a lookup table of modulation and coding schemes, the first MCS associated with a first order of modulation; and
   determine the second MCS based, at least in part, on the one bit of the change indicator, wherein the one bit indicates that the first order of modulation of the first MCS is to be decremented by one order of modulation to a second order of modulation for the second MCS.

16. The eNB of claim 15, wherein the one bit indicates that the first order of modulation of the first MCS is to be decremented to the second order of modulation for the second MCS; and the change indicator indicates to the UE to:
   set the second MCS in accordance with the second order of modulation.

17. The method of claim 16, wherein the first order of modulation is QPSK modulation or 16 QAM, and the second order of modulation is 16 QAM or 64 QAM, respectively.

* * * * *